(No Model.)
C. C. SCHILL.
ORE SEPARATOR.
No. 389,323. Patented Sept. 11, 1888.
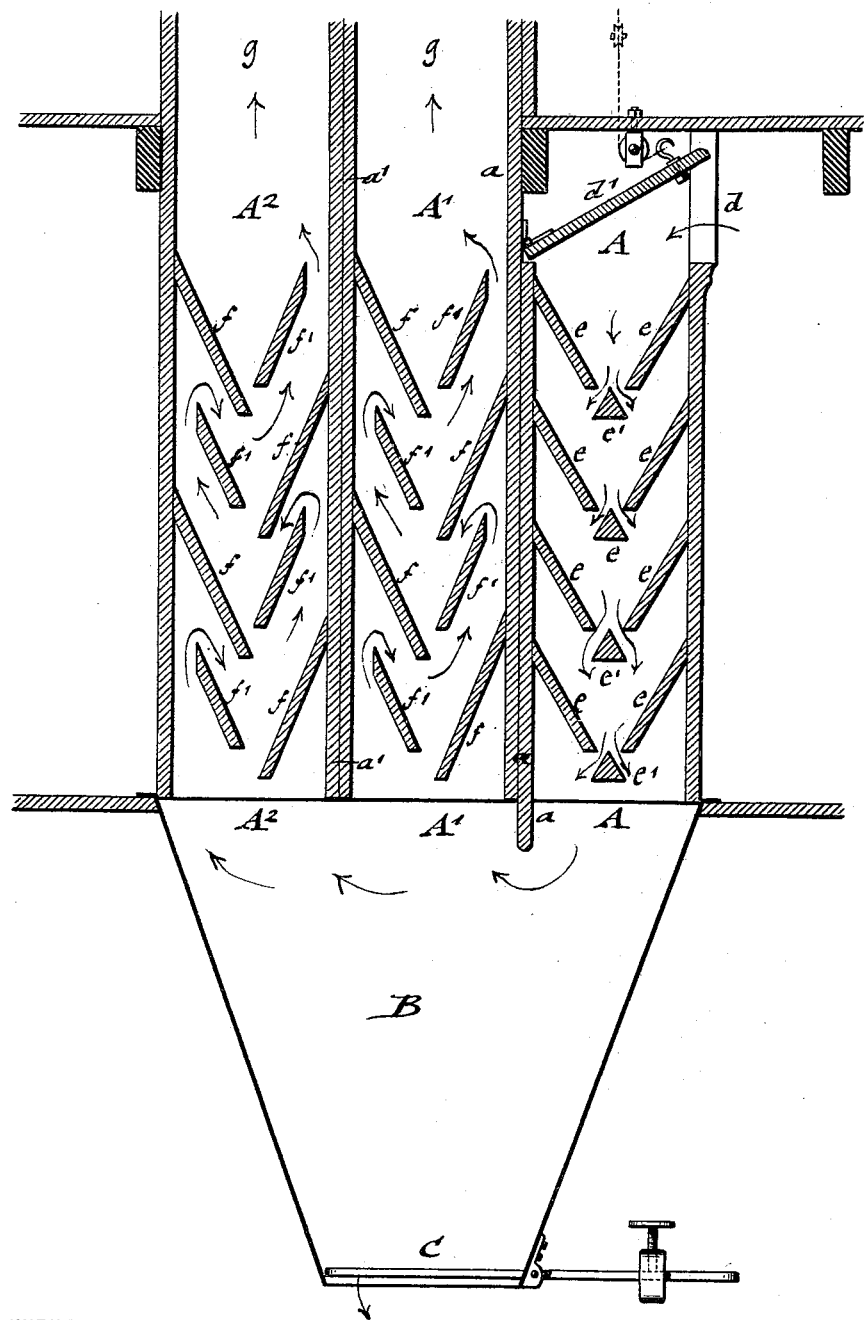
WITNESSES:
INVENTOR,
C. Charles Schill
BY
Goepel & Raegener
ATTORNEYS.

UNITED STATES PATENT OFFICE.

C. CHARLES SCHILL, OF EAST NEW YORK, N. Y.

ORE-SEPARATOR.

SPECIFICATION forming part of Letters Patent No. 389,323, dated September 11, 1888.

Application filed December 2, 1887. Serial No. 256,751. (No model.)

*To all whom it may concern:*

Be it known that I, C. CHARLES SCHILL, of East New York, in the county of Kings and State of New York, have invented certain new and useful Improvements in Ore-Separators, of which the following is a specification.

The object of this invention is to produce an improved separator for pulverized ores, cement, and other ground substances, by which the lighter particles of the same are separated from the heavier ones by means of an air-current that carries the ground substance through the different compartments of the separator, the heavier particles being collected in a hopper, from which they are intermittently discharged, while the lighter particles are carried off and collected in a settling chamber.

The accompanying drawing represents a vertical central section of my improved separator for pulverized substances, such as ore, cement, &c.

In the drawing, A A' A², &c., represent a number of separating-compartments, which are divided by transverse walls $a$ $a'$ and connected at their lower open ends by a large-sized hopper, B, with which all the compartments communicate, and which is provided at its lower end with a hinged and weighted valve, C. The gate or valve C is opened intermittently whenever the pressure of the quantity of particles deposited thereon overcomes the balance-weight of the gate, a sufficient quantity being stored up thereon to prevent the escape of the fine dust to the outside. The pulverized substances which are to be separated are conducted by a strong air-current produced by a suitable air-forcing apparatus through an opening, $d$, at the upper end of the first compartment, A, into the latter, the top of the compartment being provided with a hinged cover, $d'$, that is raised more or less, so as to permit a larger or smaller quantity of air to enter with the pulverized substances into the first compartment. The cover $d'$ also serves to deflect the air-current in a downward direction and to force the pulverized substances carried along thereby through the openings and ducts formed by inclined and symmetrically-arranged side boards, $e$ $e$, and intermediate beveled center pieces, $e'$ $e'$. The side boards, $e$ $e$, and center pieces, $e'$ $e'$, compel the pulverized substances to pass in an undulating line through the first compartment, so as to separate the heavier particles and cause them to drop into the hopper B. The lighter particles are conducted around the downwardly-extended partition-wall $a$ between the first and second compartments into the second, third, &c., compartments, A' A², which are provided alternately at opposite sides with inclined longer deflectors, $f$, and inclined shorter deflectors, $f'$, of which the former are extended up to the side walls of the compartments, while the latter are not extended up to the side walls, but terminated at some distance from the same, so as to leave air passages or ducts between their upper beveled ends and the side walls of the compartment. The longer deflectors, $f$, also extend below the lower ends of the shorter deflectors, $f'$, as shown clearly in the drawing, whereby the upward current is directed past the opening between the boards, so that the lighter particles of pulverized substances are compelled to pass around the shorter deflector, $f'$, then below the next adjoining longer deflector, $f$, to the shorter deflector at the opposite side, then around the same and along the longer deflector next above the same over to a shorter deflector, $f'$, at the first side, and so on, as indicated by arrows in the drawing. This circuitous course which is taken by the lighter particles serves to separate the lightest dust from the medium particles and causes the dropping of the latter through the spaces between the deflectors at the center of the compartment down to the hopper and the discharge-valve, while the lightest particles are conducted in upward direction and through openings and channels $g$ in the upper ends of the compartments A' A² into a closed settling-chamber arranged above the same. The heavier particles are reground and screened, and then again conducted through the separator, so that the separation of the heavier and lighter particles again takes place, and so on, the result being the quick and effective separation of the pulverized substances according to their different sizes until a powder of uniform fineness is finally obtained in the collecting-chamber.

Having thus described my invention, I claim as new and desire to secure by Letters Patent—

1. The combination of a vertical compartment provided with an inlet-opening near its top for the admission of an air-current and the pulverized substances carried thereby, said compartment having an open bottom, deflectors within said compartment, a secondary compartment disposed at one side of the primary compartment, and also having an open bottom and an opening at its top, a number of inclined long deflectors disposed on opposite sides of the secondary compartment, and a number of short deflectors alternating vertically with the long deflectors, the short deflectors being horizontally opposite the long deflectors and being out of contact with the side walls, the upper ends of the long deflectors being in contact with said side walls, and their lower ends extending below the lower ends of the short deflectors and guarding the central openings between the deflectors against the upward current, substantially as described.

2. The combination of a vertical compartment provided with an inlet-opening near its top for the admission of an air-current and the pulverized substances carried thereby, said compartment having an open bottom, deflectors within said compartment, a secondary compartment disposed at one side of the primary compartment, and also having an open bottom and an opening at its top, a number of inclined long deflectors disposed on opposite sides of the secondary compartment, and a number of short deflectors alternating vertically with the long deflectors, the short deflectors being horizontally opposite the long deflectors and being out of contact with the side walls, the upper ends of the long deflectors being in contact with said side walls, and their lower ends extending below the lower ends of the short deflectors and guarding the central openings between the deflectors against the upward current, the partition between said compartments extending downward to a point approximately in line with the inclined plane of the lower short deflector of the secondary compartment, substantially as described.

3. A vertical separating-compartment for an ascending current containing matter to be separated, having an open bottom and an opening at its top, said compartment being provided on opposite sides with downwardly-inclined long deflectors and correspondingly short deflectors disposed in alternation with the long deflectors, the short deflectors of one side being opposite the long deflectors of the other side and being out of contact with the side walls of the compartment, whereby a passage is formed between said side walls and the upper ends of said deflectors, the long deflectors being in contact at their upper ends with the side walls and extending below the lower edge of the short deflectors, and serving as guards against the passage of the upward current through the spaces between the deflectors.

In testimony that I claim the foregoing as my invention I have signed my name in presence of two subscribing witnesses.

C. CHARLES SCHILL.

Witnesses:
JOHN A. STRALEY,
SIDNEY MANN.